United States Patent [19]
Honma

[11] Patent Number: 5,297,074
[45] Date of Patent: Mar. 22, 1994

[54] ROLL-OFF FILTER APPARATUS

[75] Inventor: Kouichi Honma, Yokohama, Japan

[73] Assignee: Matsushita Electric Industrail Co., Ltd., Osaka, Japan

[21] Appl. No.: 894,610

[22] Filed: Jun. 5, 1992

[30] Foreign Application Priority Data

Jun. 14, 1991 [JP] Japan .................. 3-142916

[51] Int. Cl.$^5$ ............................................. G06G 7/02
[52] U.S. Cl. .................................................. 364/825
[58] Field of Search ............... 364/825, 724.01, 602, 364/862

[56] References Cited

U.S. PATENT DOCUMENTS 3,935,536  1/1976  Kimura et al. .................. 325/476
4,110,835  8/1978  Dubil et al. ..................... 364/862

FOREIGN PATENT DOCUMENTS 0066839 12/1982 European Pat. Off. .
60-173916 1/1986 Japan .

OTHER PUBLICATIONS

Douverne, E. et al., "Modulator und Demodulator", Nachrichtentechnische Berichte, No. 2, Dec. 1985, pp. 15-22.

Cavers, J. K., et al., "A Simple Buffer Control for Variable-Rate Communication Systems", *IEEE Transactions On Communication*, vol. 24, No. 9, Sep. 1976, pp. 1045-1048.

*Primary Examiner*—Long T. Nguyen
*Attorney, Agent, or Firm*—Mason, Fenwick & Lawrence

[57] ABSTRACT

Disclosed is a roll-off filter apparatus having a small size, a simplified circuit structure and consuming a small amount of power. In the roll-off filter apparatus attaining the above object of the invention, a ramp signal generated from a ramp pattern generator is inserted in each gap of a data input signal temporarily stored in a buffer circuit, and such a signal is filtered in a switched capacitor filter having a roll-off filter characteristic. The output signal of the switched capacitor filter is supplied to be temporarily stored in a bucket brigade device, and the output signal of the bucket brigade device is delivered at a desired signal rate.

3 Claims, 3 Drawing Sheets

ROLL-OFF FILTER APPARATUS

BACKGROUND OF THE INVENTION

This invention relates to a roll-off filter apparatus incorporated in a data transmission system using a time-division multiplexing technique.

FIG. 1 shows the structure of a prior art roll-off filter apparatus. Referring to FIG. 1, a data input terminal 1 is connected to a switch 2. Data buffers 3 and 4 are connected to the data input terminal 1 through the switch 2 and are also connected to a filter 7 through a switch 5. A ramp pattern generator 6 is connected to the filter 7 through the switch 5. A signal output terminal 8 is connected to the filter 7.

Referring also to FIG. 1, a signal having a frequency fi/M (M: an integer) is supplied to each of the data buffers 3, 4 and the ramp pattern generator 6, and signals having frequencies fi and fo are supplied to both of the data buffers 3 and 4.

The operation of the prior art roll-off filter apparatus having the structure shown in FIG. 1 will now be described. Digital data applied as an input to the data input terminal 1 at a data transmission rate of fi bits/sec are alternately supplied to the data buffers 3 and 4 through the switch 2 at the speed fo with the period of fi/M. The data stored in the data buffers 3 and 4 are alternately read out through the switch 5 at the speed fo and with the period fi/M, and, after the ramp signal generated from the ramp pattern generator 6 is added to both ends of each data block corresponding to one frame, the data signal is passed through the filter 7 before it appears as a data output signal from the signal output terminal 8. FIG. 2 shows the waveforms of the input and output signals in the case of the prior art roll-off filter apparatus.

Thus, a burst-like signal having its band limited by the roll-off filter characteristic can be produced from the prior art roll-off filter apparatus too.

However, the prior art roll-off filter apparatus has had such practical problems that the two data buffers 3 and 4 are inevitably required and that an attempt to use a filter, such as, a switched capacitor filter or a digital filter in place of the filter 7 leads to a great amount of power consumption due to the wide signal bandwidth.

SUMMARY OF THE INVENTION

It is an object of the present invention to provide a roll-off filter apparatus which is simple in its circuit structure and whose power consumption is small.

The present invention which attains the above object provides a roll-off filter apparatus comprising a buffer circuit of an FIFO type, a ramp pattern generator supplying a rising and a falling signal pattern of a burst signal, a filter of a low frequency and small power consumption type having a roll-off filter characteristic, such as, a switched capacitor filter, and an analog storage device of a serial type, such as, a bucket brigade device.

Therefore, according to the roll-off filter apparatus of the present invention which requires only one buffer circuit, the apparatus can be made small in size and simplified in structure, and the filter can be operated at a low frequency, so that the power consumption of the apparatus can be minimized.

DETAILED DESCRIPTION OF THE INVENTION

Figure 1:
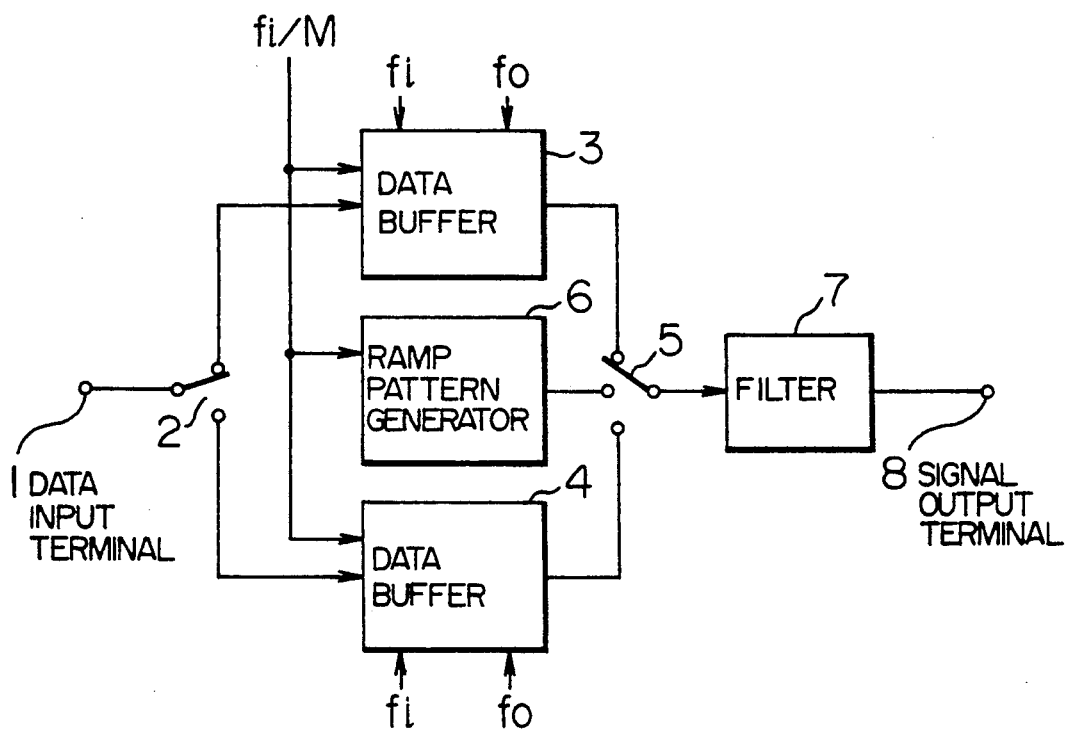
FIG. 1 is a block diagram schematically showing the structure of a prior art roll-off filter apparatus.
Figure 2:
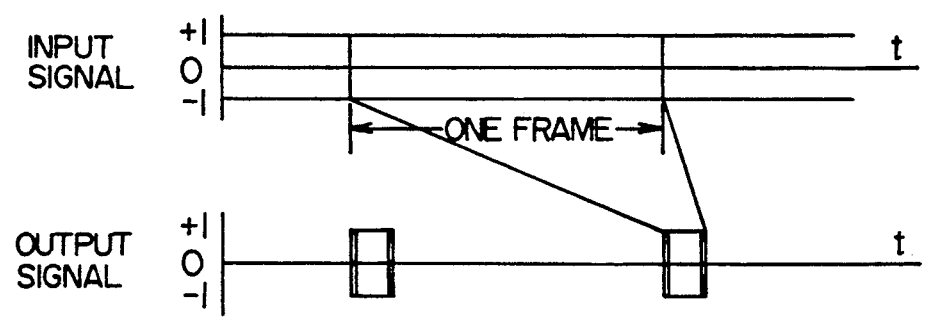
FIG. 2 shows input and output signal waveforms in the prior art apparatus shown in FIG. 1.
Figure 3:
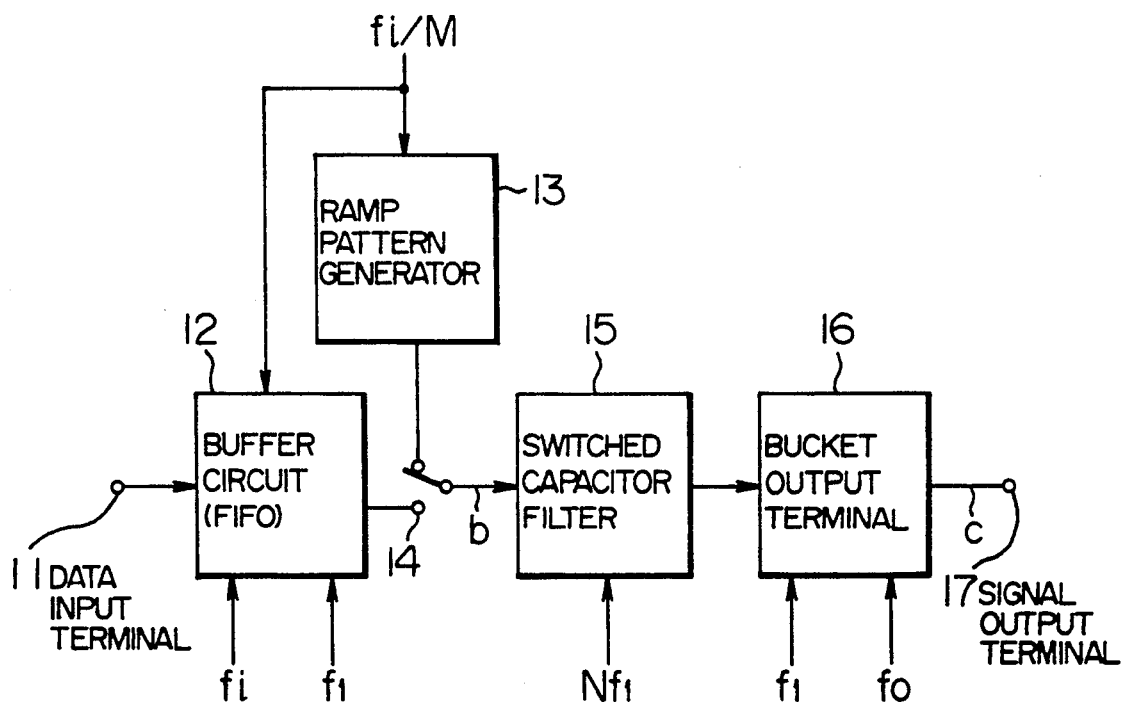
FIG. 3 is a block diagram schematically showing the structure of an embodiment of the roll-off filter apparatus according to the present invention.

FIG. 3 shows the structure of an embodiment of the roll-off filter apparatus of the present invention. Referring to FIG. 3, a data input terminal 11 is connected to a buffer circuit 12 of an FIFO (first-in first-out) type. The buffer circuit 12 is connected at its output to a switch 14 which connects a ramp pattern generator 13 to a switched capacitor filter 15. A bucket brigade device (BBD) 16 is connected at its input to the switched capacitor filter 15 and at its output to a signal output terminal 17.

Referring also to FIG. 3, a signal having a frequency fi/M (M: an integer) is supplied to each of the buffer circuit 12 and the ramp pattern generator 13, a signal having a frequency fi is supplied to the buffer circuit 12, a signal having a frequency fl is supplied to each of the buffer circuit 12 and the bucket brigade device 16, a signal having a frequency Nfl (N: an integer) is supplied to the switched capacitor filter 15, and a signal having a frequency fo is supplied to the bucket brigade device 16.

Figure 4:
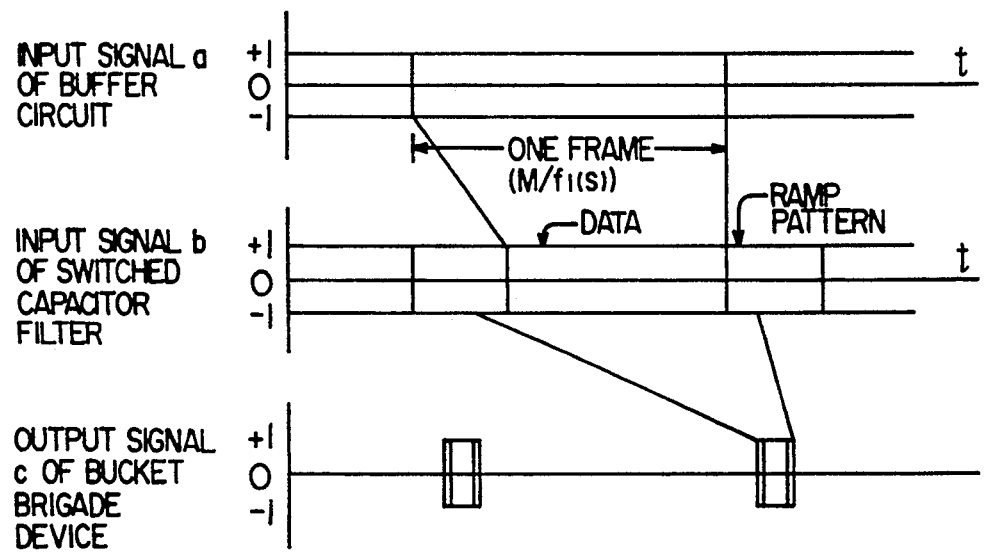
FIG. 4 shows signal waveforms appearing at various parts of the apparatus shown in FIG. 3.

The operation of the illustrated embodiment will now be described by reference to FIG. 4. Referring to FIG. 4, a data signal a applied at a data transmission rate of fi bits/sec to the data input terminal 11 is stored in the buffer circuit 12 at the frequency fi, and the output signal of the buffer circuit 12 is supplied through the switch 14 to the switched capacitor filter 15 at the frequency fl (fl>fi). The ramp pattern generated from the ramp pattern generator 13 is inserted in the gap between the data blocks each corresponding to one frame in the output signal of the buffer circuit 12. Thus, the input signal b of the switched capacitor filter 15 has a waveform as shown in FIG. 4.

Then, this signal b is filtered by the switched capacitor filter 15 having a roll-off filter characteristic corresponding to a data transmission rate of fl bits/sec, and the output signal of the switched capacitor filter 15 is supplied to the bucket brigade device 16 at the data transmission rate of fl bits/sec. The bucket brigade device 16 delivers its output signal in which each data block corresponding to one frame and the ramp pattern added to both ends of each data block are accumulated as shown at c in FIG. 4. Such an output signal c of the bucket brigade device 16 is delivered at the frequency fo (fo<fl) to appear at the signal output terminal 17.

Thus, the operation of the illustrated embodiment of the present invention comprises temporarily storing in the buffer circuit 12 a data input signal applied through the data input terminal 11, reading out the data signal from the buffer circuit 12 at a higher speed to supply it to the switched capacitor filter 15, receiving the ramp pattern from the ramp pattern generator 13 through the switch 14, inserting the ramp pattern in the gap between the data blocks in the output signal of the buffer circuit 12, filtering such a signal in the switched capacitor filter 15 according to the roll-off filter characteristic, supplying the output signal of the switched capacitor filter 15 to the bucket brigade device 16, and, after temporarily storing the data signal in the bucket brigade device 16, reading out the data signal at a desired signal rate to deliver the data signal from the signal output terminal 17. Therefore, a band-limited burst signal can be produced by the apparatus of the present invention which is small in size and simple in circuit structure and whose power consumption is small.

I claim:

1. A roll-off filter apparatus comprising
a buffer circuit of a first in first out type having an input for receiving a data input signal made up on data blocks with gaps therebetween, said buffer circuit also having an output,
a ramp pattern generator having an output for supplying a rising and falling signal pattern in the form of a burst signal,
a filter with an input and having a roll-off filter characteristic,
switch means connected to said outputs of said buffer circuit and said ramp pattern generator and said input of said filter, said filter receiving at its input a signal from said switch means in which said rising and falling signal pattern is inserted in said gaps between each of said data blocks in said data input signal, and
an analog storage device receiving the output signal of said filter as its input, said device having a variable input/output data transmission rate.

2. A roll-off filter apparatus according to claim 1, wherein said filter is a switched capacitor filter.

3. A roll-off filter apparatus according to claim 1, wherein said analog storage device is a bucket brigade device.

* * * * *